(12) United States Patent
Higuchi

(10) Patent No.: US 12,354,188 B2
(45) Date of Patent: Jul. 8, 2025

(54) DISPLAY SYSTEM, VIRTUAL SPACE PROVIDING APPARATUS, AND DISPLAY METHOD

(71) Applicant: Mitsubishi Electric Corporation, Tokyo (JP)

(72) Inventor: Hirohiko Higuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 251 days.

(21) Appl. No.: 18/219,718

(22) Filed: Jul. 10, 2023

(65) Prior Publication Data

US 2023/0351645 A1 Nov. 2, 2023

Related U.S. Application Data

(63) Continuation of application No. PCT/JP2021/002940, filed on Jan. 28, 2021.

(51) Int. Cl.
*G06T 11/00* (2006.01)
*G06Q 10/10* (2023.01)
(Continued)

(52) U.S. Cl.
CPC ........ *G06T 11/001* (2013.01); *G06T 2210/62* (2013.01)

(58) Field of Classification Search
CPC ..... G06T 11/001; G06T 19/006; G06T 19/20; G06T 7/70; G06T 7/207; G06T 13/40;
(Continued)

(56) References Cited

U.S. PATENT DOCUMENTS 10,242,501 B1 * 3/2019 Pusch .................. H04N 19/43

FOREIGN PATENT DOCUMENTS

JP          11328243 A  * 11/1999 ............. G06T 19/00
JP       H11-328243 A     11/1999
(Continued)

OTHER PUBLICATIONS

International Search Report and Written Opinion mailed on Apr. 20, 2021, received for PCT Application PCT/JP2021/002940, filed on Jan. 28, 2021, 8 pages including English Translation.

*Primary Examiner* — Wesner Sajous
(74) *Attorney, Agent, or Firm* — XSENSUS LLP

(57) ABSTRACT

A display system includes: an operation screen information acquiring unit to acquire operation screen information indicating an operation screen for receiving an operation by an operator; an operation screen providing unit to provide the operation screen indicated by the operation screen information to the operator by displaying the operation screen on a display device; and a virtual space providing unit to provide a virtual space including a virtual operation screen simulating the operation screen indicated by the operation screen information to the operator by displaying the virtual space on a display device. When the operation screen information acquiring unit acquires the operation screen information indicating the operation screen being browsed or operated by the operator, the virtual space providing unit displays an avatar corresponding to the operator at a position in the virtual space corresponding to the virtual operation screen simulating the operation screen.

16 Claims, 14 Drawing Sheets

(51) Int. Cl.
*G06Q 50/08* (2012.01)
*G06T 19/00* (2011.01)
*G09B 9/00* (2006.01)

(58) Field of Classification Search
CPC ........... G06T 2210/62; G06T 2219/024; G06T
2200/04; G06T 17/20; G06T 2207/10028;
G06T 5/00–5/08; G06T 7/00; G06T
11/40; G06T 13/20; G06T 13/60; G06F
16/954; G06F 3/013–016; G06F 17/5005;
G06F 3/14; G09B 9/307; G09B 9/46;
G09B 9/00; G09B 9/02; G09B 19/003;
G09B 25/02; G09G 5/02; G09G 5/006;
G09G 5/14; G09G 5/30; G09G 5/32;
G09G 5/37–38; G09G 2320/02; G09G
2320/06; G09G 2320/0666
See application file for complete search history.

(56) References Cited

FOREIGN PATENT DOCUMENTS

| | | | | |
|---|---|---|---|---|
| JP | 2016-139350 A | | 8/2016 | |
| JP | 6159217 B2 | * | 7/2017 | ........... G09B 19/003 |
| KR | 20190140759 A | * | 6/2018 | ............. G06Q 50/08 |
| KR | 102085271 B1 | * | 12/2019 | ............. G06Q 50/08 |

* cited by examiner

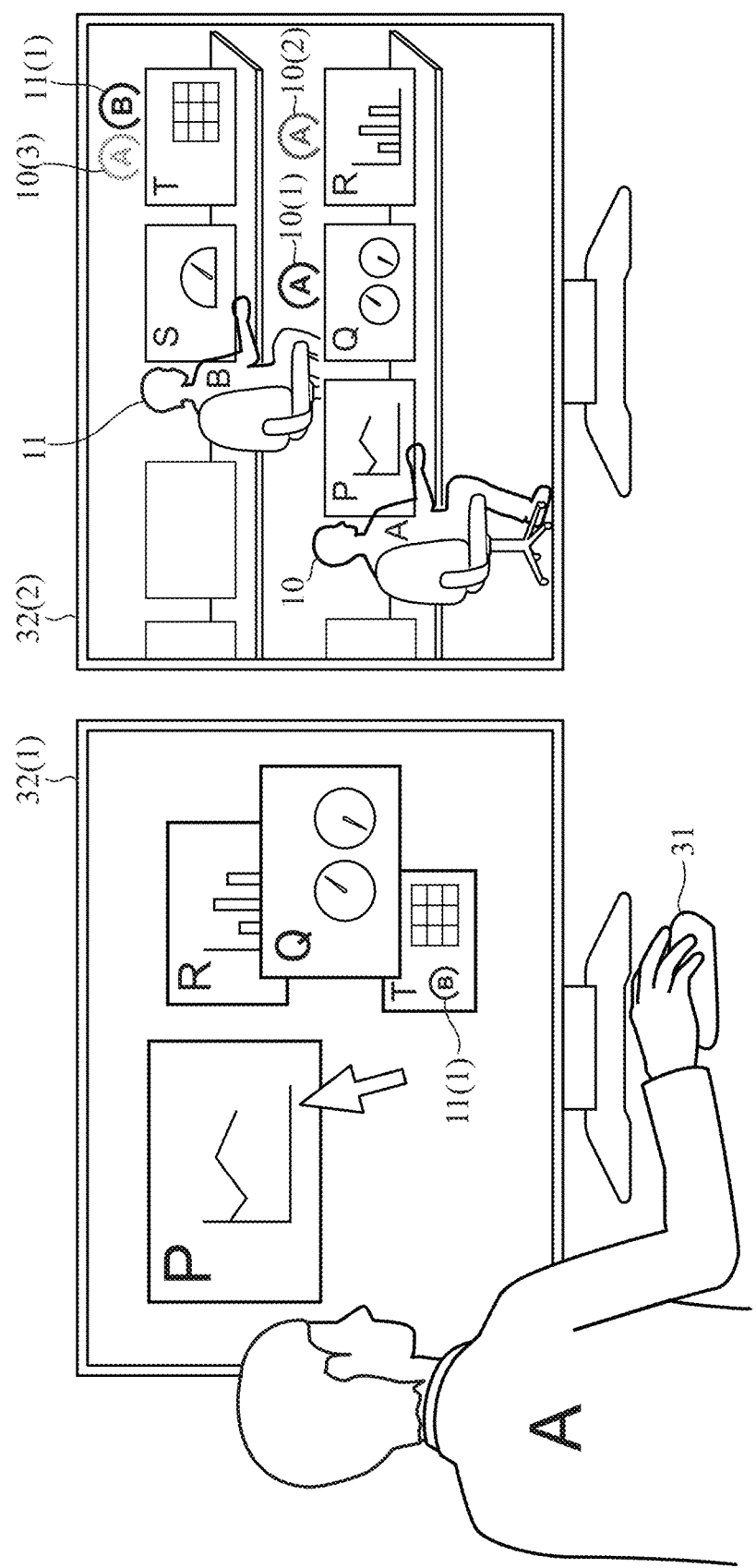

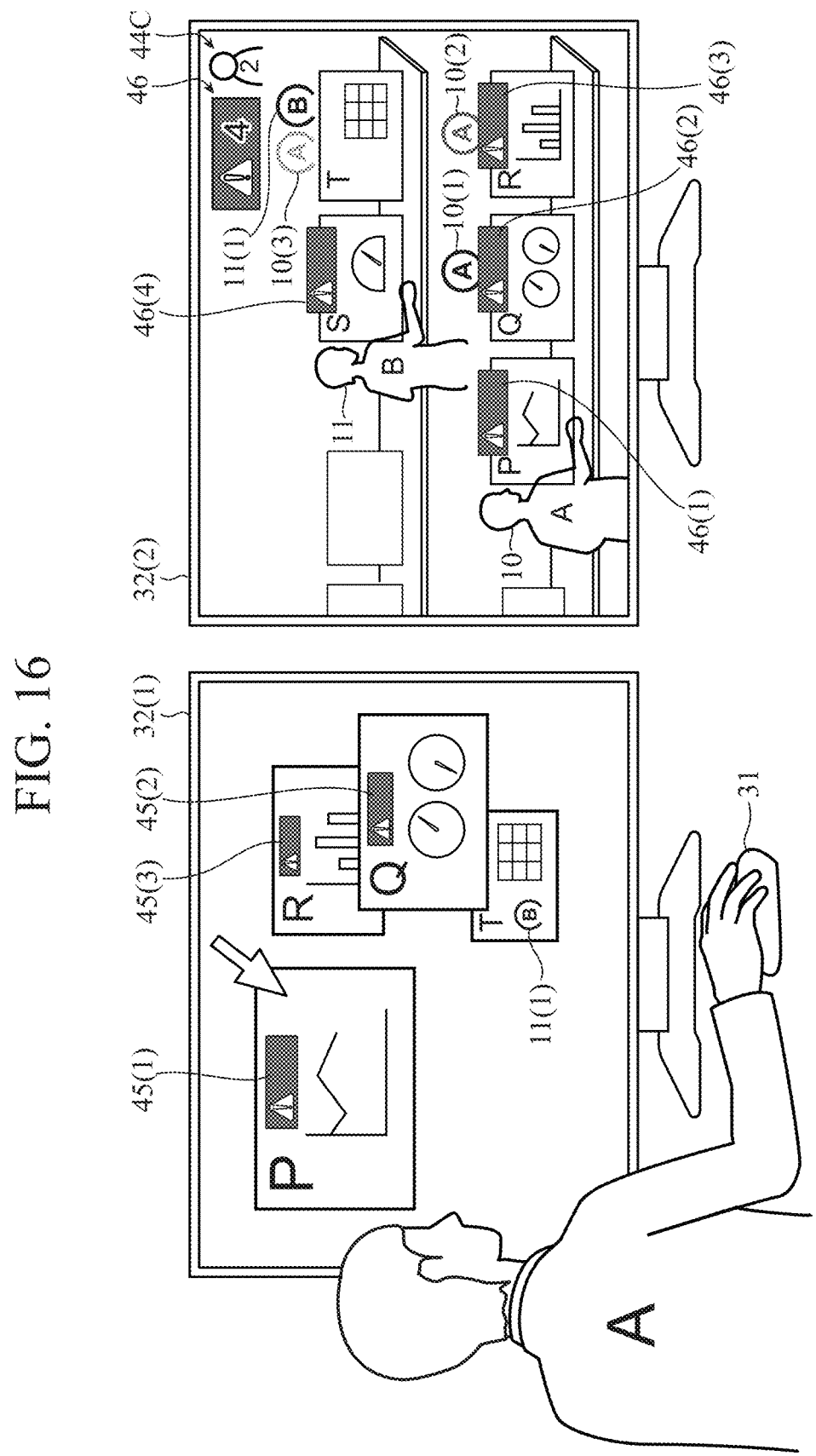

DISPLAY SYSTEM, VIRTUAL SPACE PROVIDING APPARATUS, AND DISPLAY METHOD

CROSS REFERENCE TO RELATED APPLICATIONS

The present application is a bypass continuation of PCT filing PCT/JP2021/002940, filed Jan. 28, 2021, the entire contents of which are incorporated herein by reference.

TECHNICAL FIELD

The present disclosure relates to a display system, a virtual space providing apparatus, and a display method.

BACKGROUND ART

In recent years, information processing systems using avatars simulating actual operators have become widespread. For example, a plant design support system described in Patent Literature 1 performs three-dimensional computer graphics display of plant design content to test an operation status of a plant. The system changes plant design contents on the basis of simulation output data of a plant event, generates an action of a virtual operator on the basis of an operation procedure manual and human attribute data according to the change, determines whether an operation of the plant design content is completed or not on the basis of the action of the virtual operator, and evaluates the plant design content on the basis of the action of the virtual operator or the determination of whether the operation is completed or not.

In addition, the plant design support system described in Patent Literature 1 moves a virtual operator in a virtual control room by operation, or selects and operates equipment in the virtual control room, and causes the virtual operator to follow this operation.

CITATION LIST

Patent Literature

Patent Literature 1: Japanese Patent Laid-open Publication No. 11-328243

SUMMARY OF INVENTION

Technical Problem

However, the conventional virtual reality technology is mainly aimed at bringing a virtual space closer to a real space, and information that cannot be made visible in the real space, in other words, nonverbal information such as a situation or atmosphere is not expressed. Therefore, there is a problem that it is not possible to grasp which screen the operator is monitoring and how much a workload status is even when the virtual space or the virtual operator (Hereinafter, it is referred to as an avatar) is visually recognized.

For example, in the plant design support system described in Patent Literature 1, an operator's purpose is to operate a screen for controlling a plant. For this reason, there is also a troublesome operation that can be performed only through the virtual space, such as moving an avatar in the virtual space or pressing a switch in the virtual space.

In the plant design support system described in Patent Literature 1, when an operation of a virtual operation switch becomes necessary, an avatar of an operator is moved to the virtual operation switch, and then the operation switch is operated by the avatar. Therefore, in a case where the virtual operation switch is not operated, it is not possible to grasp whether or not the operator corresponding to the avatar is performing work in the virtual control room. In addition, in order to operate the operation switch, a troublesome operation, which performs an operation via the virtual space once, such as moving the avatar of the operator or operating the switch in the virtual control room, occurs, and the preliminary operation occurs before reaching the operation of the operation switch, which is the original purpose.

The present disclosure solves the above problems, and an object of the present disclosure is to obtain a display system, a virtual space providing apparatus, and a display method capable of providing a combination of a virtual space and an operation screen in which a monitoring status and a workload status of an operator can be grasped with a small number of steps.

Solution to Problem

A display system according to the present disclosure includes processing circuitry to acquire operation screen information indicating an operation screen for receiving an operation by an operator, to provide the operation screen indicated by the operation screen information to the operator by displaying the operation screen on a display device and to provide a virtual space including a virtual operation screen simulating the operation screen indicated by the operation screen information to the operator by displaying the virtual space on a display device. When the processing circuitry acquires the operation screen information indicating the operation screen being browsed or operated by the operator, the processing circuitry displays an avatar corresponding to the operator at a position in the virtual space corresponding to the virtual operation screen simulating the operation screen.

Advantageous Effects of Invention

According to the present disclosure, when operation screen information indicating an operation screen being browsed or operated by an operator is acquired, a virtual space in which an avatar corresponding to the operator is displayed at a position in the virtual space corresponding to a virtual operation screen simulating the operation screen is provided. The operator can grasp, via the virtual space, a screen watched by an operator and a workload status of the operator for a plurality of operators in the real world. As a result, the display system according to the present disclosure can provide a combination of the virtual space and the operation screen in which the monitoring status and the workload status of each operator can be grasped with a small number of steps.

BRIEF DESCRIPTION OF DRAWINGS

FIG. 5 is a diagram illustrating a display example of a display device in the first embodiment.

FIG. 16 is a view illustrating a display example of a display device in the fourth embodiment.

DESCRIPTION OF EMBODIMENTS

First Embodiment

Figure 1:
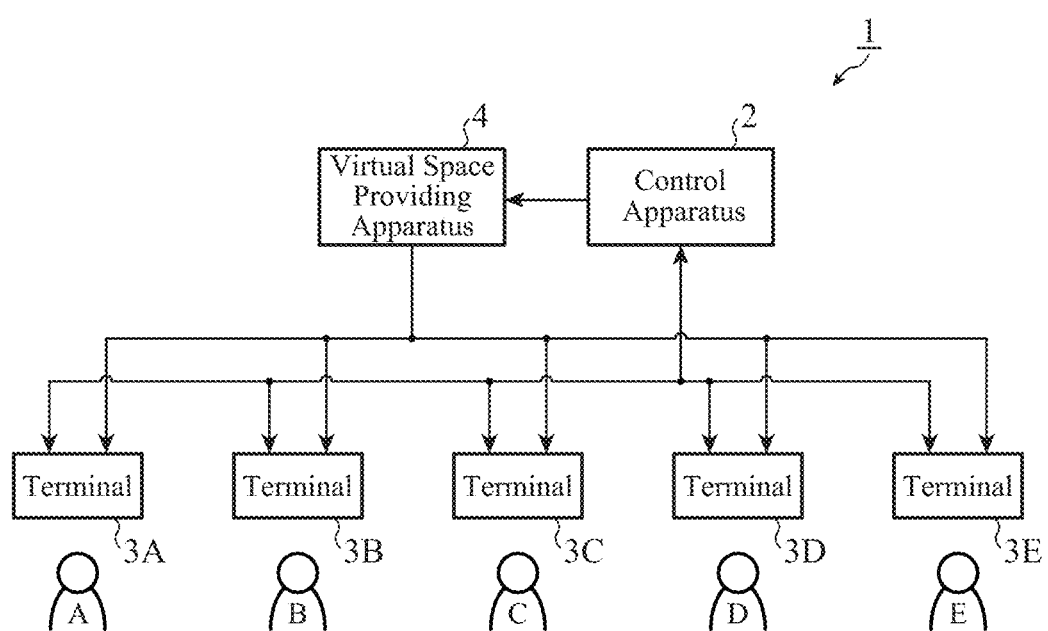
FIG. 1 is a block diagram illustrating a configuration of a display system according to a first embodiment.

FIG. 1 is a block diagram illustrating a configuration of a display system 1 according to a first embodiment. In FIG. 1, the display system 1 is used in a system that monitors and controls a facility to be monitored, such as various plant facilities, power facilities, or water treatment facilities, and provides a graphical user interface (Hereinafter, it is referred to as a GUI) for monitoring control processing. The GUI provided by the display system 1 includes an operation screen for receiving an operation from a terminal used by an operator and presenting a processing result of the received operation to the operator. The operation screen may be displayed on the entire screen of the display device, or may be a slave screen (window) displayed in a partial area in the screen of the display device.

The display system 1 includes a control apparatus 2, terminals 3A to 3E, and a virtual space providing apparatus 4. The control apparatus 2, the terminals 3A to 3E, and the virtual space providing apparatus 4 are connected to each other in a wired or wireless manner. In FIG. 1, the number of operators is five indicated by A to E. The operator A uses the terminal 3A, the operator B uses the terminal 3B, the operator C uses the terminal 3C, the operator D uses the terminal 3D, and the operator E uses the terminal 3E. The control apparatus 2 receives selection of work content from the terminals 3A to 3E, and generates operation screen information indicating an operation screen for performing an operation on the selected work content. Note that the operation screen for operating the work content is not limited to a single screen, and may include a plurality of screens. The control apparatus 2 outputs the operation screen information to the virtual space providing apparatus 4.

The virtual space providing apparatus 4 displays an operation screen indicated by the operation screen information on a display device included in a terminal of an operator who has selected a work content corresponding to the operation screen, and further displays a virtual space including a virtual operation screen simulating the operation screen on a display device included in each of the terminals 3A to 3E. For example, when the operator A selects the work content using the terminal 3A, an operation screen for operating the selected work content is displayed on the display device included in the terminal 3A. As a result, the operator A can browse the operation screen displayed on the display device included in the terminal 3A and further operate the operation screen.

When the operator A selects the work content, the virtual space providing apparatus 4 displays, on the display device included in each of the terminals 3A to 3E, a virtual space including a virtual operation screen simulating an operation screen corresponding to the work content selected by the operator A and an avatar arranged at a position corresponding to the virtual operation screen. The avatar is an avatar corresponding to the operator A.

When the operators B to E select the work contents, respectively, operation screens corresponding to the work contents respectively selected by the operators B to E are displayed on the display devices included in the terminals 3B to 3E, respectively, similarly to the above, and a virtual space including virtual operation screens respectively simulating these operation screens and avatars is further displayed. These avatars are avatars corresponding to the operators B to E, respectively. For example, by visually recognizing the virtual space, the operator A can know the operators working in the virtual space, the number of works of each operator, and the work contents corresponding to the virtual operation screens, and thereby being able to grasp a workload status of each operator in the virtual space.

Figure 2:
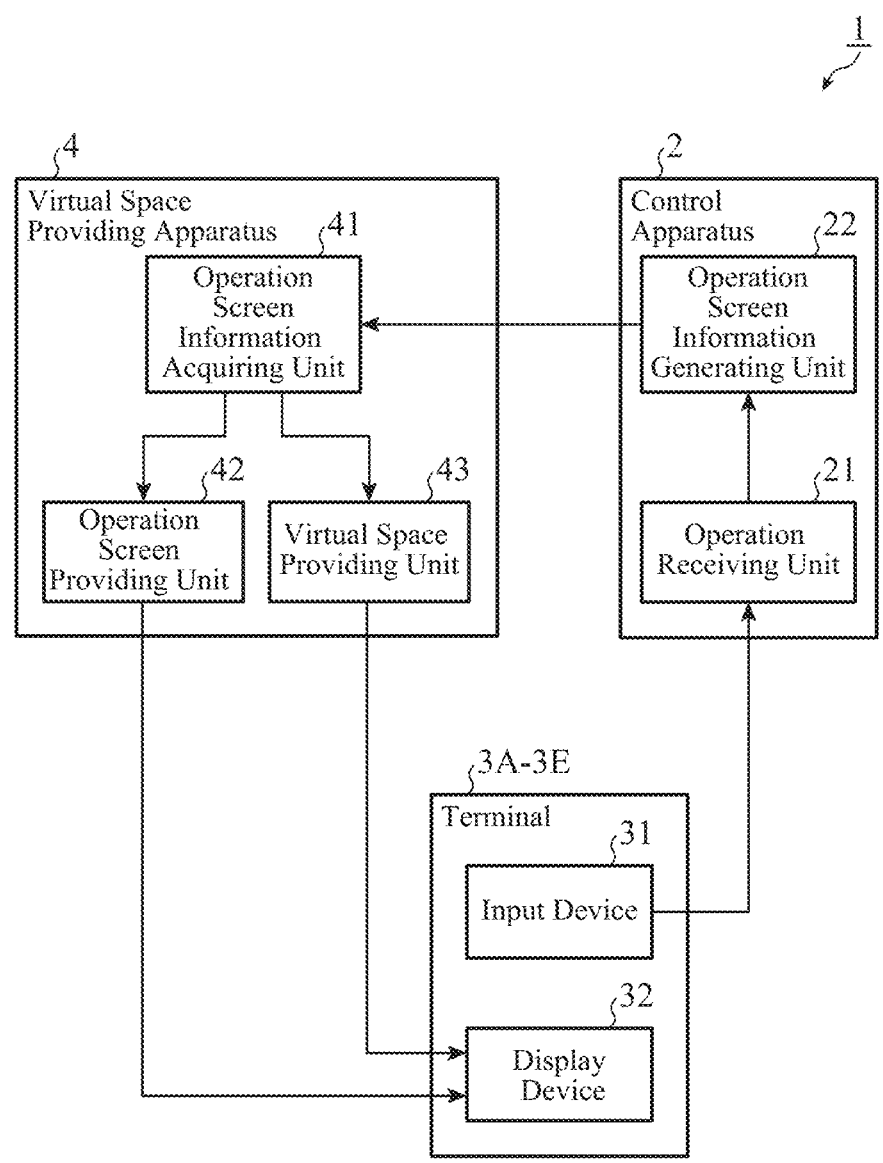
FIG. 2 is a block diagram illustrating configurations of a control apparatus, a terminal, and a virtual space providing apparatus.

FIG. 2 is a block diagram illustrating configurations of the control apparatus 2, the terminals 3A to 3E, and the virtual space providing apparatus 4. In FIG. 2, the control apparatus 2 is, for example, an apparatus that monitors and controls a facility to be monitored, and includes an operation receiving unit 21 and an operation screen information generating unit 22. Each of the terminals 3A to 3E includes an input device 31 and a display device 32. The virtual space providing apparatus 4 includes an operation screen information acquiring unit 41, an operation screen providing unit 42, and a virtual space providing unit 43.

The operation receiving unit 21 receives information input using the input device 31 included in each of the terminals 3A to 3E. For example, the operation receiving unit 21 receives operation information or work content selection information input using the input device 31 in each of the terminals 3A to 3E. Note that the operation information indicates, for example, an operation content using the input device 31 on an operation screen displayed on the display device 32.

The operation screen information generating unit 22 generates operation screen information indicating an operation screen corresponding to the work content selected by each of the operators A to E on the basis of the selection information of the work content received from each of the terminals 3A to 3E. The operation screen information includes, for example, address information of a terminal used by the operator to select the work content in addition to screen layout information of an operation screen for operating the work content selected by the operator.

The input device 31 is used by each of the operators A to E to input information in each of the terminals 3A to 3E, and is, for example, a keyboard, a mouse, or a touch panel. The display device 32 may be a display mounted on each of the terminals 3A to 3E, or may be an external display. The display device 32 is not limited to one display, and may be a display that displays an operation screen and a display that displays a virtual space.

The operation screen information acquiring unit 41 acquires operation screen information indicating an operation screen for receiving an operation from an operator. For example, the operation screen information acquiring unit 41 acquires the operation screen information output from the operation screen information generating unit 22 included in the control apparatus 2. The operation screen providing unit 42 provides the operator with an operation screen indicated by the operation screen information by displaying the operation screen on the display device 32 included in each of the terminals 3A to 3E. For example, the operation screen providing unit 42 specifies the terminal used to select the work content on the basis of the address information included in the operation screen information, and displays the operation screen on the display device 32 included in the specified terminal. In addition, when there are a plurality of types of operation screens to be displayed on the display device 32, the operation screen providing unit 42 displays each operation screen as a window screen on the display device 32.

The virtual space providing unit 43 provides the operator with a virtual space including a virtual operation screen simulating the operation screen indicated by the operation screen information by displaying the virtual space on the display device. Furthermore, when the operation screen information acquiring unit 41 acquires the operation screen information indicating the operation screen being browsed or operated by the operator, the virtual space providing unit 43 displays an avatar corresponding to the operator at a position in the virtual space corresponding to the virtual operation screen simulating the operation screen.

Figure 3:
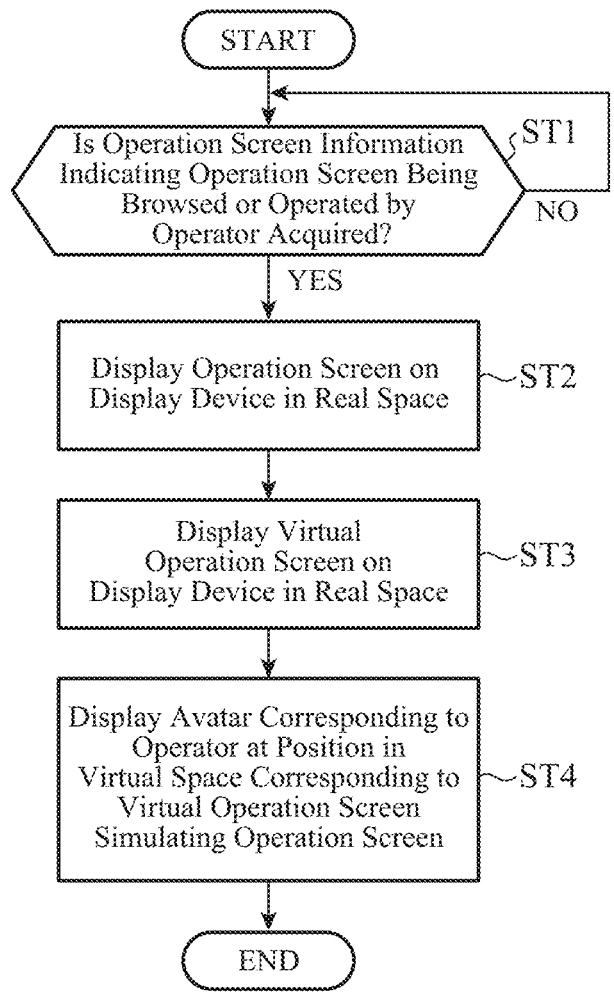
FIG. 3 is a flowchart illustrating a display method according to the first embodiment.

FIG. 3 is a flowchart illustrating a display method according to the first embodiment.

The operation screen information acquiring unit 41 checks whether or not the operation screen information indicating an operation screen being browsed or operated by the operator has been acquired (step ST1). For example, when the operator first selects a work content, the operation screen information acquiring unit 41 acquires operation screen information indicating an operation screen corresponding to the selected work content. Alternatively, when the operator operates the operation screen displayed on the display device 32 using the input device 31, the operation information is output to the control apparatus 2, and the operation screen information indicating the operated operation screen is generated. The operation screen information acquiring unit 41 acquires the operation screen information indicating an operated operation screen. When no operation screen information is acquired from the control apparatus 2 (step ST1; NO), the operation screen information acquiring unit 41 repeats the check processing in step ST1.

When the operation screen information acquiring unit 41 acquires the operation screen information (step ST1; YES), the operation screen providing unit 42 displays the operation screen indicated by the operation screen information on the display device 32 in the real space (step ST2). For example, the operation screen providing unit 42 generates image information of the operation screen on the basis of the screen layout information included in the operation screen information. Then, the operation screen providing unit 42 outputs the generated image information to a display device 32 included in the terminal that has selected the work content corresponding to the operation screen indicated by the operation screen information or a display device 32 included in the terminal that has operated the operation screen among the terminals 3A to 3E. The display device 32 displays an operation screen using the image information.

The virtual space providing unit 43 displays a virtual operation screen simulating the operation screen indicated by the operation screen information on the display device 32 in the real space (step ST3). For example, the virtual space providing unit 43 generates image information of the virtual operation screen on the basis of the screen layout information included in the operation screen information. The virtual space providing unit 43 outputs the generated image information to the display device 32 included in each of the terminals 3A to 3E. The display device 32 displays a virtual operation screen using the image information. Note that, in the flow shown in FIG. 3, the virtual operation screen is displayed after the operation screen is displayed on the display device 32, but these may be displayed simultaneously, or the virtual operation screen may be displayed first.

The virtual space providing unit 43 displays an avatar corresponding to the operator at a position in the virtual space corresponding to the virtual operation screen simulating the operation screen (step ST4). Here, the position in the virtual space corresponding to the virtual operation screen is a position in the virtual operation screen and its surrounding area when viewed by the operator from the display screen of the display device 32. For example, in a case where the operator operates the operation screen, the virtual space providing unit 43 displays, on the display device 32, the virtual space in which the avatar is arranged at a position overlapping with the virtual operation screen simulating the operation screen. In a case where the operator is only browsing the operation screen, the virtual space providing unit 43 displays, on the display device 32, the virtual space in which the avatar is arranged at a surrounding portion of the virtual operation screen simulating the operation screen.

Figure 4:
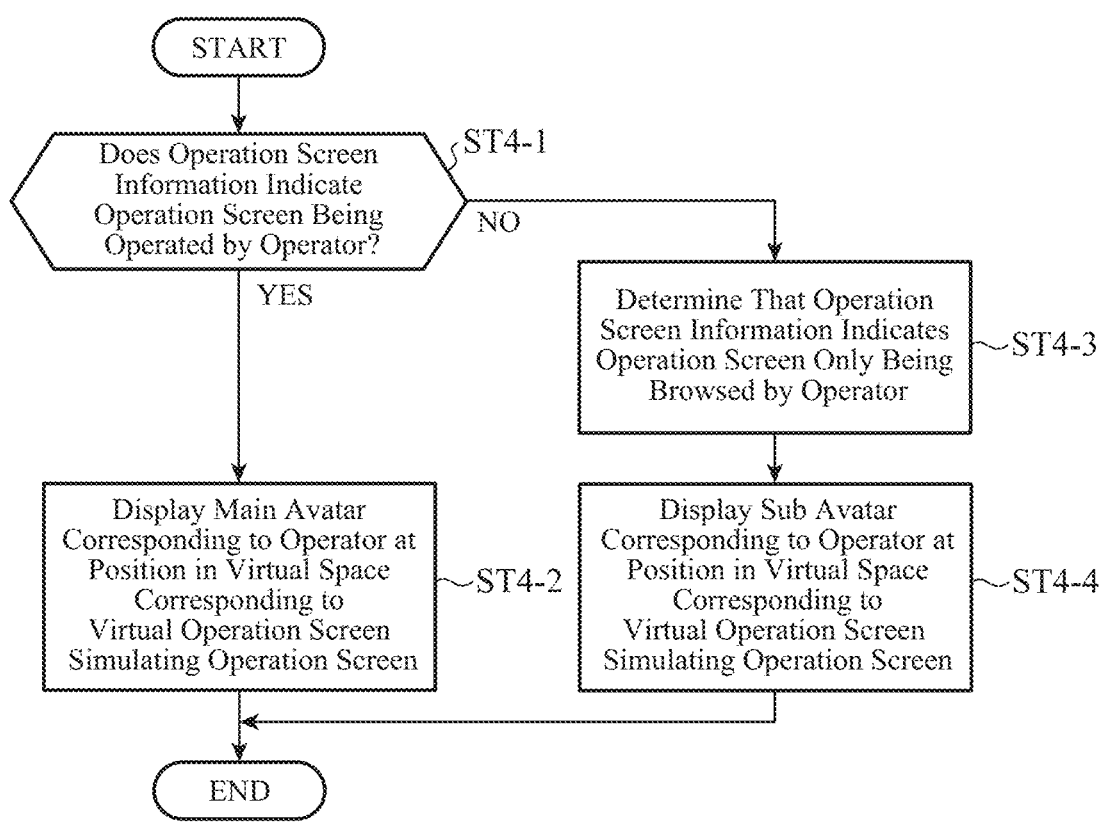
FIG. 4 is a flowchart illustrating detailed processing of step ST4 in FIG. 3.

FIG. 4 is a flowchart illustrating detailed processing of step ST4 in FIG. 3.

The virtual space providing unit 43 determines whether or not the operation screen information acquired by the operation screen information acquiring unit 41 is operation screen information indicating an operation screen being operated by the operator (step ST4-1). When it is determined that the acquired operation screen information indicates an operation screen operated by the operator (step ST4-1; YES), the virtual space providing unit 43 displays, on the display device 32 included in each of the terminals 3A to 3E, a main avatar corresponding to the operator at a position overlapping with the virtual operation screen simulating the operation screen (step ST4-2). The main avatar is an avatar image representing an operator operating a virtual operation screen.

When it is determined that the acquired operation screen information does not indicate the operation screen operated by the operator (step ST4-1; NO), the virtual space providing unit 43 determines that the operation screen information acquired by the operation screen information acquiring unit 41 indicates an operation screen only browsed by the operator (step ST4-3). The operation screen information acquired by the operation screen information acquiring unit 41 indicates an operation screen corresponding to the work content selected by the operator. That is, the operation screen indicated by the operation screen information is displayed on the display device 32 so as to be browsable even when not operated by the operator.

The virtual space providing unit 43 displays, on the display device 32 included in each of the terminals 3A to 3E, a sub avatar corresponding to the operator at a position in the virtual space corresponding to the virtual operation screen simulating the operation screen (step ST4-4). For example, the sub avatar is displayed in a surrounding portion of the virtual operation screen. The sub avatar is an avatar image indicating that the operator is only browsing the virtual operation screen, and is, for example, a graphic image to which identification information such as a name, a nickname, or an ID of the operator is added.

FIG. 5 is a diagram illustrating display examples of the display device 32(1) and the display device 32(2). In FIG. 5, the terminal 3A used by the operator A includes a display device 32(1) and a display device 32(2). The operation screen providing unit 42 displays an operation screen P, an operation screen Q, an operation screen R, and an operation screen T on the display device 32(1) on the basis of the operation screen information. The operator A uses a mouse as the input device 31 to operate the operation screen P displayed on the display device 32(1), and only browses the operation screen Q, the operation screen R, and the operation screen T.

The virtual space providing unit 43 displays, on the display device 32(2), a virtual space in which a main avatar 10 corresponding to the operator A is disposed at a position overlapping the virtual operation screen P simulating the operation screen P operated by the operator A, a sub avatar 10(1) corresponding to the operator A is disposed in a surrounding portion of the virtual operation screen Q simulating the operation screen Q among the operation screen Q, the operation screen R, and the operation screen T only browsed by the operator A, a sub avatar 10(2) corresponding to the operator A is disposed in a surrounding portion of the virtual operation screen R simulating the operation screen R, and a sub avatar 10(3) corresponding to the operator A is disposed in a surrounding portion of the virtual operation screen T simulating the operation screen T. Furthermore, in the virtual space displayed on the display device 32(2), a main avatar 11 corresponding to the operator B is disposed at a position overlapping with the virtual operation screen S simulating the operation screen S operated by the operator B, and a sub avatar 11(1) corresponding to the operator B is disposed in a surrounding portion of the virtual operation screen T simulating the operation screen T only browsed by the operator B.

By visually recognizing the virtual space displayed on the display device 32(2), the operator A can know the operators (the operator A and the operator B) working in the virtual space, can know the number of operation screens used for the work by the operator A and the operator B as the number of works of the operators, and can know the work content from each of the virtual operation screens. As a result, the operator A can grasp the workload status of the entire operators working in the virtual space.

The virtual space providing unit 43 may display the sub avatars 10(1) to 10(3) in at least one of a color, transparency, and a size according to an attention degree of the operator A with respect to the operation screen Q, the operation screen R, and the operation screen T displayed and browsed on the display device 32(1). The work content corresponding to the operation screen attracting attention of the operator can be information indicating a workload status of the operator. In addition, in a case where work is performed by displaying a plurality of operation screens (window screens) on the display device, it can be considered that the attention degree of the operator is higher as the operation screen is closer to the front side.

For example, in FIG. 5, the operation screen Q is displayed in front of the operation screen R and the operation screen T on the display device 32(1). That is, the operator A pays the most attention to the operation screen Q other than the operation screen P being currently operated, and then pays higher attention to the operation screen R and then pays lower attention to the operation screen T. In the virtual space providing unit 43, at least one of a color, transparency, and a size according to the order of display (attention degree) of the operation screen on the display device is set.

FIG. 5 illustrates a case where transparency according to the attention degree of the operation screen displayed on the display device 32(1) is set in the virtual space providing unit 43. For example, in the work using the operation screen Q, the operation screen R, and the operation screen T, when the operator A sets the display order so that the operation screen Q, the operation screen R, and the operation screen T are displayed from the front side to the back side in this order, the control apparatus 2 generates the operation screen information including the display order.

On the basis of the operation screen information generated by the control apparatus 2, the virtual space providing unit 43 displays, on the display device 32(2), the sub avatar 10(1) disposed at the position corresponding to the virtual operation screen Q to have the lowest transparency and the sub avatar 10(2) disposed at the position corresponding to the virtual operation screen R and the sub avatar 10(3) disposed at the position corresponding to the virtual operation screen T to have higher to lower transparency in this order. By visually recognizing this virtual space, it is possible to grasp that the operator A pays attention to the operation screen Q, the operation screen R, and the operation screen T in this order on the basis of the transparency of the sub avatar corresponding to the operator A.

The virtual space providing unit 43 may display, on the display device 32(2), the sub avatar in a color according to the attention degree of the operation screen. For example, the virtual space providing unit 43 displays the sub avatar disposed at a position corresponding to the virtual screen simulating the operation screen having the highest attention degree in red for calling attention, and changes the color of the sub avatar from reddish color to yellow to green as the attention degree of the corresponding operation screen decreases.

Furthermore, the virtual space providing unit 43 may display, on the display device 32(2), the sub avatar in a size according to the attention degree of the operation screen. For example, the virtual space providing unit 43 displays the sub avatar disposed at the position corresponding to the virtual screen simulating the operation screen having the highest attention degree to be the largest, and displays the sub avatar such that the size decreases as the attention degree of the corresponding operation screen decreases.

Furthermore, the virtual space providing unit 43 may display, on the display device 32(2), the sub avatar in a combination of at least two of a color, transparency, and a size according to the attention degree of the operation screen. For example, the virtual space providing unit 43 displays the sub avatar, disposed at a position corresponding to the virtual screen simulating the operation screen having the highest attention degree, in red and with the lowest transparency and the largest size, and displays the sub avatar such that the color changes from reddish to green through yellow, the transparency increases, and the size decreases as the attention degree of the corresponding operation screen decreases. The operator can grasp which operation screen the operator pays attention to by visually recognizing the sub avatar in the virtual space.

In a case where work is performed by displaying a plurality of operation screens (window screens) on the display device, it can be considered that the larger the display area of the operation screen is, the higher the attention degree of the operator is. Therefore, the virtual space providing unit 43 may display the sub avatar in at least one of a color, transparency, and a size according to the display area of the operation screen in the screen of the display device 32(1).

For example, the virtual space providing unit 43 calculates coefficients RW and RH considering the display area of the operation screen in the screen of the display device 32(1) according to the following formulas (1) and (2), and adopts the smaller one of the RW and RH as the coefficient R in which the display area of the operation screen is taken into consideration. The virtual space providing unit 43 calculates the transparency T of the sub avatar according to the following Formula (3). In the following Formulae (1) to (3), W0 is a reference width (pixel) of the operation screen displayed on the display device 32(1), and H0 is a reference height (pixel) of the operation screen displayed on the display device 32(1). W1 is a current width (pixel) of the operation screen displayed on the display device 32(1), and H1 is a current height (pixel) of the operation screen displayed on the display device 32(1). DM is a display magnification of the content displayed on the operation screen. A is the ratio of the display area according to the display order of the operation screens on the display device 32(1), and the ratio A of the foremost operation screen is 100(%). FR is a flag value indicating whether or not the operation screen is displayed on the forefront, the value of FR of the operation screen displayed on the forefront is "1", and the value of FR of the operation screen displayed other than the forefront is "0". U is a coefficient appropriately set by the operator, and a range of a value larger than 0 and smaller than 1 can be set.

$$RW = (W1/W0) \times DM \times A \quad (1)$$

$$RH = (H1/H0) \times DM \times A \quad (2)$$

$$T = (1-FR) \times (1-R \times U) \quad (3)$$

When viewed at the display screen of the display device 32(2), the virtual space providing unit 43 may display at least a portion of the main avatar 10 overlapping with the virtual operation screen P only with the contour, and may display at least a portion of the main avatar 11 overlapping with the virtual operation screen S only with the contour.

For example, as illustrated in FIG. 5, the virtual space providing unit 43 sets the main avatar 10 as an avatar image simulating only the contour of the operator A, and sets the main avatar 11 as an avatar image simulating only the contour of the operator B. As a result, the display content of the virtual operation screen P can be visually recognized even when the main avatar 10 is disposed in the front surface, and the display content of the virtual operation screen S can be visually recognized even when the main avatar 11 is disposed in front.

The operation screen providing unit 42 may add an image indicating a second operator to the operation screen being browsed or operated by the second operator other than a first operator among the operation screens browsed or operated by the first operator, and display the operation screen on the display device. In FIG. 5, it is assumed that the first operator is an operator A and the second operator is an operator B. For example, among the operation screens browsed or operated by the operator A, the operation screen T is also browsed by the operator B. The operation screen providing unit 42 adds a sub avatar 11(1), which is an image indicating the operator B, to the operation screen T and displays the sub avatar on the display device 32(1). As a result, the operator A visually recognizes the sub avatar 11(1) added to the operation screen T displayed on the display device 32(1), and thus can grasp that the operation screen T is also browsed by the operator B.

The functions of the operation screen information acquiring unit 41, the operation screen providing unit 42, and the virtual space providing unit 43 in the virtual space providing apparatus 4 are implemented by a processing circuit. That is, the virtual space providing apparatus 4 includes a processing circuit for executing the processing from step ST1 to step ST4 illustrated in FIG. 3. The processing circuit may be dedicated hardware, or may be a central processing unit (CPU) that executes a program stored in a memory.

Figure 6A:
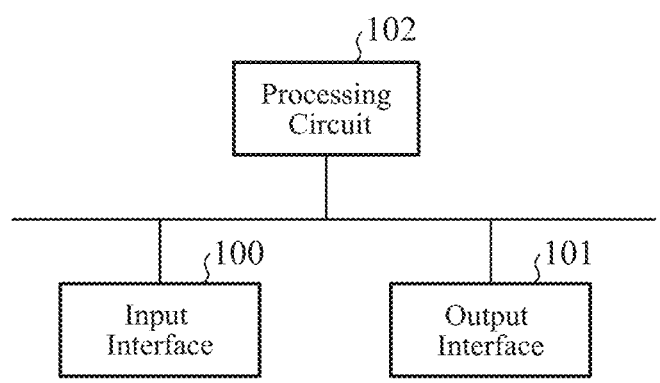
FIG. 6A is a block diagram illustrating a hardware configuration for implementing the functions of the virtual space providing apparatus according to the first embodiment.
Figure 6B:
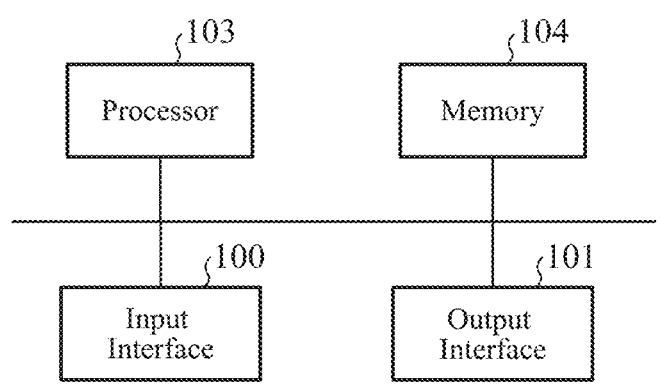
FIG. 6B is a block diagram illustrating a hardware configuration for executing software for implementing the functions of the virtual space providing apparatus according to the first embodiment.

FIG. 6A is a block diagram illustrating a hardware configuration that implements the function of the virtual space providing apparatus 4. FIG. 6B is a block diagram illustrating a hardware configuration for executing software that implements the function of the virtual space providing apparatus 4. In FIGS. 6A and 6B, an input interface 100 is an interface that relays information such as operation screen information output from the control apparatus 2 to the virtual space providing apparatus 4. An output interface 101 is an interface that relays each piece of image information of the operation screen and the virtual space output from the virtual space providing apparatus 4 to the terminals 3A to 3E.

In a case where the processing circuit is a processing circuit 102 of dedicated hardware illustrated in FIG. 6A, the processing circuit 102 corresponds to, for example, a single circuit, a composite circuit, a programmed processor, a parallel-programmed processor, an application specific integrated circuit (ASIC), a field-programmable gate array (FPGA), or a combination thereof. The functions of the operation screen information acquiring unit 41, the operation screen providing unit 42, and the virtual space providing unit 43 in the virtual space providing apparatus 4 may be implemented by separate processing circuits, or these functions may be collectively implemented by one processing circuit.

In a case where the processing circuit is a processor 103 illustrated in FIG. 6B, the functions of the operation screen information acquiring unit 41, the operation screen providing unit 42, and the virtual space providing unit 43 in the virtual space providing apparatus 4 are implemented by software, firmware, or a combination of software and firmware. Note that the software or firmware is described as a program and stored in a memory 104.

The processor 103 reads and executes the program stored in the memory 104, thereby implementing the functions of the operation screen information acquiring unit 41, the operation screen providing unit 42, and the virtual space providing unit 43 in the virtual space providing apparatus 4. For example, the virtual space providing apparatus 4 includes the memory 104 for storing a program that results in execution of the processing of steps ST1 to ST4 in the flowchart illustrated in FIG. 3 when executed by the processor 103. These programs cause a computer to execute procedures or methods of processing performed by the operation screen information acquiring unit 41, the operation screen providing unit 42, and the virtual space providing unit 43. The memory 104 may be a computer-readable storage medium storing a program for causing a computer to function as the operation screen information acquiring unit 41, the operation screen providing unit 42, and the virtual space providing unit 43.

The memory 104 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a DVD.

Some parts of the functions of the operation screen information acquiring unit 41, the operation screen providing unit 42, and the virtual space providing unit 43 in the virtual space providing apparatus 4 may be implemented by dedicated hardware, and the other parts thereof may be implemented by software or firmware. For example, the operation screen information acquiring unit 41 implements the function by the processing circuit 102 which is dedicated hardware, and the operation screen providing unit 42 and the virtual space providing unit 43 implement the function by the processor 103 reading and executing the program stored in the memory 104. As described above, the processing circuit can implement the above functions by hardware, software, firmware, or a combination thereof.

As described above, the display system 1 according to the first embodiment includes the operation screen information acquiring unit 41 to acquire the operation screen information indicating the operation screen for receiving the operation by the operator, the operation screen providing unit 42 to provide the operation screen indicated by the operation screen information to the operator by displaying the operation screen on the display device 32(1), and the virtual space providing unit 43 to provide the virtual space including the virtual operation screen simulating the operation screen indicated by the operation screen information to the operator by displaying the virtual space on the display device 32(2).

When the operation screen information acquiring unit 41 acquires the operation screen information indicating the operation screen being browsed or operated by the operator, the virtual space providing unit 43 displays an avatar corresponding to the operator at a position in the virtual space corresponding to the virtual operation screen simulating the operation screen.

The operator can grasp the workload status in the virtual space by visually recognizing the avatar in the virtual space and the virtual operation screen, displayed on the display device 32(2).

In the display system 1 according to the first embodiment, the virtual space providing unit 43 displays the avatar 10 being a main avatar corresponding to the operator A at a position in the virtual space corresponding to the virtual operation screen simulating the operation screen operated by the operator A, and displays avatars being sub avatars 10(1), 10(2), and 10(3) corresponding to the operator A at positions in the virtual space corresponding to the virtual operation screens Q, R, and T simulating the operation screens Q, R, and T only browsed by the operator A. By visually recognizing the virtual space, it is possible to grasp the operation screen operated by the operator A and the operation screen only browsed by the operator A. As a result, the operators A to E can grasp the workload status of the operator A in the virtual space.

In the display system 1 according to the first embodiment, the virtual space providing unit 43 displays the sub avatar in at least one of a color, transparency, and a size corresponding to the attention degree of the operator to the operation screen displayed on the display device 32. The operator can grasp the workload status in the virtual space by visually recognizing the sub avatar.

In the display system 1 according to the first embodiment, the virtual space providing unit 43 displays the sub avatar in at least one of a color, transparency, and a size corresponding to the display area of the operation screen in the screen of the display device 32. By visually recognizing the sub avatar, it is possible to grasp the workload status of the operator in the virtual space.

In the display system 1 according to the first embodiment, the virtual space providing unit 43 displays at least a portion of the avatar overlapping with the virtual operation screen as viewed from the display screen of the display device 32 with only the contour of the avatar. Even when the avatar is disposed in front, the display content of the virtual operation screen can be visually recognized. As a result, it is possible to grasp the workload status of the operator in the virtual space.

In the display system 1 according to the first embodiment, the operation screen providing unit 42 adds an image indicating the operator B to the operation screen being browsed or operated by the operator B that is an operator other than the operator A among a plurality of operation screens, each of which is the operation screen, browsed or operated by the operator A, and displays the operation screen on the display device 32. By visually recognizing the image indicating the operator B added to the operation screen displayed on the display device 32, the operator A can grasp that the operation screen is also browsed by the operator B. As a result, it is possible to grasp the workload status of the operator in the virtual space.

Second Embodiment

Figure 7:
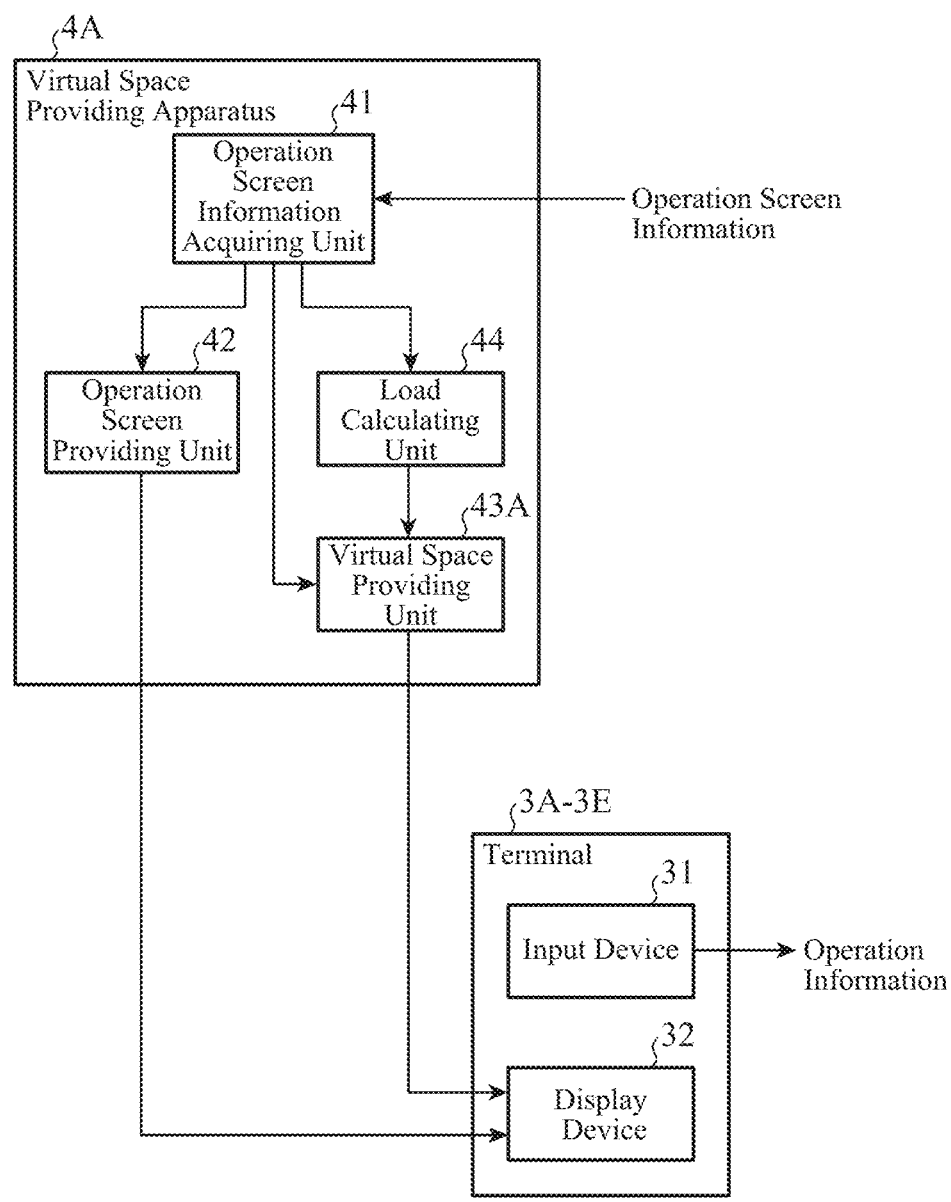
FIG. 7 is a block diagram illustrating a configuration of a virtual space providing apparatus according to a second embodiment.

FIG. 7 is a block diagram illustrating a configuration of a virtual space providing apparatus 4A according to a second embodiment. In FIG. 7, the virtual space providing apparatus 4A includes an operation screen information acquiring unit 41, an operation screen providing unit 42, a virtual space providing unit 43A, and a load calculating unit 44. The load calculating unit 44 calculates a value indicating the workload of the operator. The workload of the operator is, for example, at least one of the number of unprocessed tasks of the work corresponding to the operation screen displayed on the display device 32 and the continuous work time of the operator using the operation screen.

For example, the load calculating unit 44 counts the number of pieces of operation screen information corresponding to the operation received from the terminals 3A to 3E, and sets the number of pieces of operation screen information for each terminal as the number of unprocessed tasks of the work corresponding to the operation screen. In addition, the load calculating unit 44 counts the continuous work time of the operator A by using, as a trigger, a time point at which the operator A starts an operation on the operation screen from a state in which a certain time (for example, 10 minutes) has elapsed since the work of the operator A stopped.

The virtual space providing unit 43A displays an avatar to which image information indicating the workload calculated by the load calculating unit 44 has been added. For example, the image information indicating the workload is the number of unprocessed tasks of the operator and the continuous work time of the operator. The virtual space providing unit 43A adds image information indicating the number of unprocessed tasks of the operator and the continuous work time of the operator to the avatar corresponding to the operator.

Figure 8:
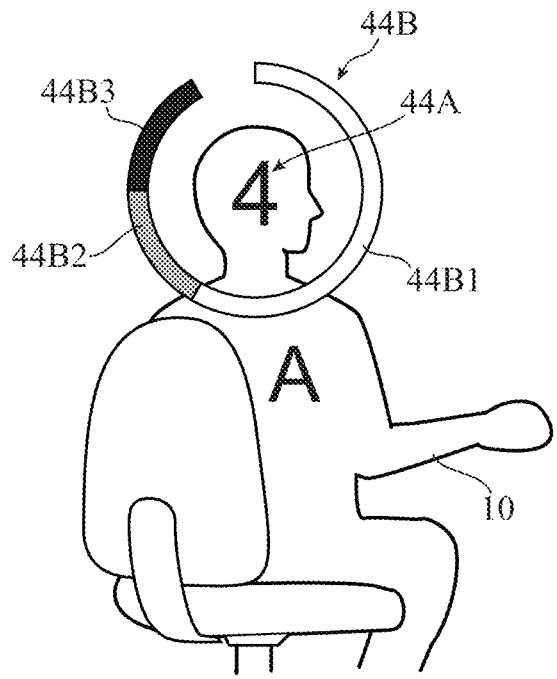
FIG. 8 is a diagram illustrating a display example of a main avatar and a workload image in the second embodiment.

FIG. 8 is a diagram illustrating a display example of the main avatar 10 and the workload image, and illustrates a case where the workload image is added to the main avatar 10 corresponding to the operator A. In FIG. 8, the virtual space providing unit 43A adds a workload image including a text image 44A indicating the number of unprocessed tasks of the operator A and a work time image 44B indicating the continuous work time of the operator A to the main avatar 10. For example, when the number of unprocessed tasks of the operator A is "4", the text image 44A is "4" as illustrated in FIG. 8.

The work time image 44B is an image that extends annularly with the lapse of time, and represents, for example, 60 minutes per round. When the operator A starts work using the operation screen, the load calculating unit 44 counts the work time. The work time counted by the load calculating unit 44 is output to the virtual space providing unit 43A. When the load calculating unit 44 starts counting the work time of the operator A, the virtual space providing unit 43A starts drawing the work time image 44B related to the operator A. Note that the work time image 44B illustrated in FIG. 8 illustrates an image when the operator A continues the work for 55 minutes.

An image portion 44B1 in the work time image 44B is an image portion when 35 minutes have elapsed since the start of the work by the operator A. It is assumed that the number of unprocessed tasks of the operator A is smaller than "4" at the time point 55 minutes elapse from the start of the work and smaller than a first reference number (4>the first reference number) in the time period until 35 minutes elapse from the start of the work of the operator A. In this case, the virtual space providing unit 43A draws the image portion 44B1 in blue, which is a safe color, for example. Note that the first reference number is, for example, a threshold of the number of unprocessed tasks for notifying that the workload has increased.

An image portion 44B2 in the work time image 44B is an image portion when 10 minutes have further elapsed from the time point when 35 minutes have elapsed since the start of the work by the operator A. In the time period from 35 minutes to 45 minutes, it is assumed that the number of unprocessed tasks of the operator A is smaller than "4" at the time point 55 minutes elapse from the start of the work and larger than the first reference number, but is smaller than a second reference number (4>the second reference number>the first reference number). In this case, the virtual space providing unit 43A draws the image portion 44B2 in yellow, which is an attention-seeking color, for example. Note that the second reference number is, for example, a threshold of the number of unprocessed tasks for notifying that the workload is becoming excessive.

An image portion 44B3 in the work time image 44B is an image portion when 10 minutes have further elapsed from the time point when 45 minutes have elapsed since the start of the work by the operator A. In the time period from 45 minutes to 55 minutes, the number of unprocessed tasks of the operator A is "4", which is larger than the second reference number. In this case, the virtual space providing unit 43A draws the image portion 44B3 in red, which is the attention-seeking color, for example. By visually recognizing the workload image as described above, the operator can grasp the number of unprocessed tasks of the operator corresponding to the avatar to which the workload image is added, the continuous work time, and the transition of the workload status with the progress of the work.

Note that the case where 4>the second reference number>the first reference number has been described, but the relationship of the reference number for determining the number of unprocessed tasks in the virtual space providing unit 43A is not limited thereto.

Furthermore, the virtual space providing unit 43A displays, on the display device 32, an avatar in a color according to the workload calculated by the load calculating unit 44. For example, in a case where the number of unprocessed tasks of the work corresponding to the operation screen is larger than the threshold, the virtual space providing unit 43A displays the main avatar and the sub avatar in red in order to alert the operator that the workload is excessive. As the number of unprocessed tasks of the work corresponding to the operation screen decreases, the virtual space providing unit 43A changes the colors of the main avatar and the sub avatar from reddish color to green through yellow.

Figure 9A:
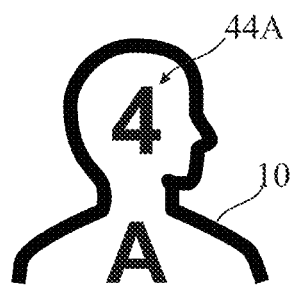
FIG. 9A is a diagram illustrating a display example (1) of the main avatar in the second embodiment.
Figure 9B:
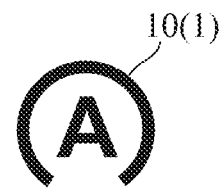
FIG. 9B is a diagram illustrating a display example (1) of a sub avatar in the second embodiment.

FIG. 9A is a diagram illustrating a display example (1) of the main avatar 10. Furthermore, FIG. 9B is a diagram illustrating a display example (1) of the sub avatar 10(1). In FIGS. 9A and 9B, it is assumed that the number of unprocessed tasks of the operator A is "4" larger than the second reference number. In this case, the virtual space providing unit 43A displays the main avatar 10 and the sub avatar 10(1) in red, for example, in order to alert the operator that the workload is excessive.

Figure 10A:
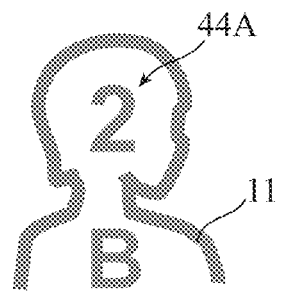
FIG. 10A is a diagram illustrating a display example (2) of the main avatar in the second embodiment.
Figure 10B:
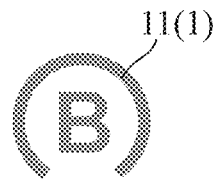
FIG. 10B is a diagram illustrating a display example (2) of the sub avatar in the second embodiment.

FIG. 10A is a diagram illustrating a display example (2) of the main avatar 11. Furthermore, FIG. 10B is a diagram illustrating a display example (2) of the sub avatar 11(1). In FIGS. 10A and 10B, it is assumed that the number of unprocessed tasks of the operator B is "2" smaller than the first reference number. In this case, since the workload of the operator B is low, the virtual space providing unit 43A displays the main avatar 11 and the sub avatar 11(1) in, for example, blue which is a safe color.

Furthermore, the virtual space providing unit 43A may display the avatar in at least one of transparency and a size according to the workload of the operator, in addition to the color according to the workload of the operator.

For example, the virtual space providing unit 43A displays an avatar corresponding to an operator having a high workload with low transparency, and displays the avatar so that the transparency increases as the workload decreases. Furthermore, the virtual space providing unit 43A displays the avatar corresponding to the operator having a high workload in a large size, and displays the avatar so that the size decreases as the workload decreases.

Furthermore, the virtual space providing unit 43A may display the sub avatar in a combination of at least two of a color, transparency, and a size according to the workload of the operator. For example, the virtual space providing unit 43A displays an avatar corresponding to an operator having a high workload in red and with the lowest degree of transparency and the largest size, and displays the avatar such that the color changes from reddish color to green through yellow, the degree of transparency increases, and the size is reduced as the workload decreases. By visually recognizing the avatar in the virtual space, the operator can grasp the workload status.

The load calculating unit 44 may calculate the number of operators. For example, the load calculating unit 44 counts the number of terminals that have received the selection of the work content among the terminals 3A to 3E, and outputs the counted value to the virtual space providing unit 43A as the number of operators working in the virtual space. The virtual space providing unit 43A displays, on the display device 32(2), the virtual space including the image indicating the number of operators calculated by the load calculating unit 44.

Figure 11:
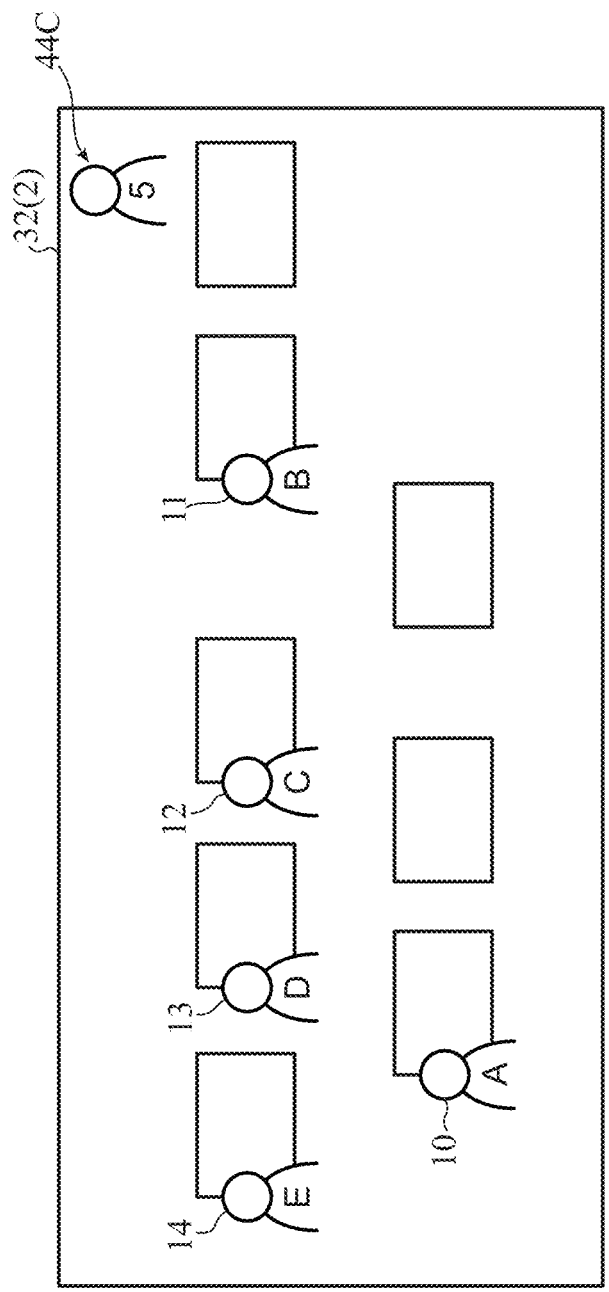
FIG. 11 is a diagram illustrating a display example of a virtual space in the second embodiment.

FIG. 11 is a diagram illustrating a display example of the virtual space. In the virtual space illustrated in FIG. 11, avatars 10 to 14 respectively corresponding to the operators A to E are displayed, and the number of operators working in the virtual space is "5". The virtual space providing unit 43A displays, on the display device 32(2), an image 44C indicating the number of operators. By visually recognizing the image 44C, the operator can easily recognize the number of operators who are performing work other than the operator.

Note that the functions of the operation screen information acquiring unit 41, the operation screen providing unit 42, the virtual space providing unit 43A, and the load calculating unit 44 in the virtual space providing apparatus 4A are implemented by the processing circuit illustrated in FIG. 6A or 6B. That is, the virtual space providing apparatus 4A includes a processing circuit for executing the processing described in the second embodiment. The processing circuit may be dedicated hardware, or may be a CPU that executes a program stored in a memory.

As described above, the virtual space providing apparatus 4A according to the second embodiment includes the load calculating unit 44 that calculates a value indicating the workload of the operator. The virtual space providing unit 43A displays an avatar in a color corresponding to the workload calculated by the load calculating unit 44. The operator can grasp the workload status in the virtual space by visually recognizing the color of the avatar in the virtual space.

In the virtual space providing apparatus 4A according to the second embodiment, the virtual space providing unit 43A displays the avatar to which the images 44A and 44B indicating the workload calculated by the load calculating unit 44 are added. In addition, the load calculating unit 44 calculates at least one of the number of unprocessed tasks corresponding to the operation screen or the continuous work time of the operator using the operation screen as the workload. The operator can grasp the workload status in the virtual space by visually recognizing the images 44A and 44B added to the avatar.

In the virtual space providing apparatus 4A according to the second embodiment, the load calculating unit 44 calculates the number of operators. The virtual space providing unit 43A displays, on the display device, the virtual space including the image 44C indicating the number of operators calculated by the load calculating unit 44. By visually recognizing the image 44C, the operator can easily recognize the number of operators who are performing work other than the operator.

Third Embodiment

Figure 12:
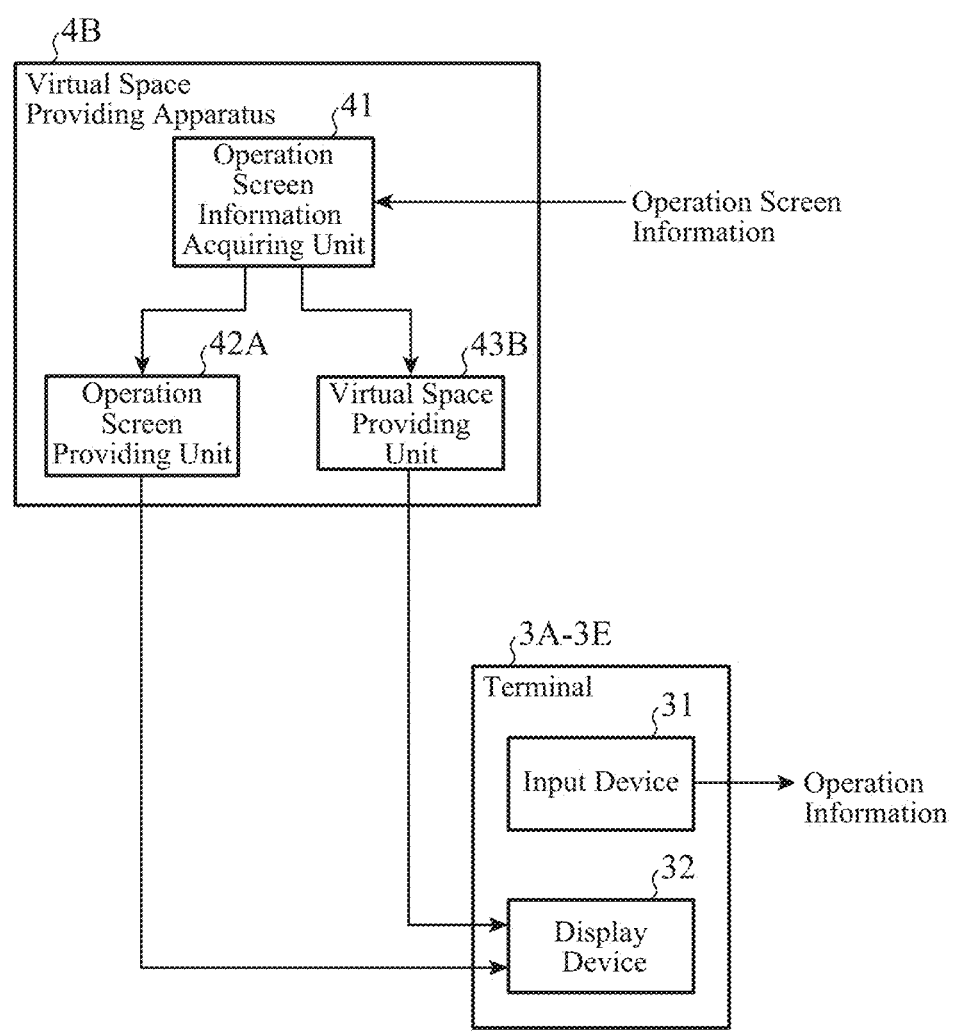
FIG. 12 is a block diagram illustrating a configuration of a virtual space providing apparatus according to a third embodiment.

FIG. 12 is a block diagram illustrating a configuration of a virtual space providing apparatus 4B according to a third embodiment. In FIG. 12, the virtual space providing apparatus 4B includes an operation screen information acquiring unit 41, an operation screen providing unit 42A, and a virtual space providing unit 43B. When the virtual operation screen in the virtual space is selected, the operation screen information acquiring unit 41 acquires, from the control apparatus 2, operation screen information indicating an operation screen corresponding to the selected virtual operation screen. The operation screen providing unit 42A displays, on the display device 32, an operation screen corresponding to the virtual operation screen selected by the operator on the basis of the operation screen information acquired by the operation screen information acquiring unit 41.

Furthermore, when an avatar in the virtual space is selected, the operation screen information acquiring unit 41 acquires, from the control apparatus 2, operation screen information indicating an operation screen being browsed or operated by an operator corresponding to the selected avatar. The operation screen providing unit 42A displays, on the display device 32, an operation screen being browsed or operated by the operator corresponding to the selected avatar on the basis of the operation screen information acquired by the operation screen information acquiring unit 41.

When the virtual operation screen or the avatar in the virtual space is selected, the virtual space providing unit 43B displays a sub avatar corresponding to the operator who has selected the virtual operation screen or the avatar at a position in the virtual space which corresponds to the virtual operation screen simulating the operation screen being browsed or operated by the operator for which a virtual operation screen or an avatar is selected. For example, when the operator A selects the virtual operation screen simulating the operation screen being browsed or operated by the operator B or the avatar corresponding to the operator B, the virtual space providing unit 43B displays the sub avatar corresponding to the operator A at a position in the virtual space corresponding to the virtual operation screen simulating the operation screen being browsed or operated by the operator B.

Figure 13:
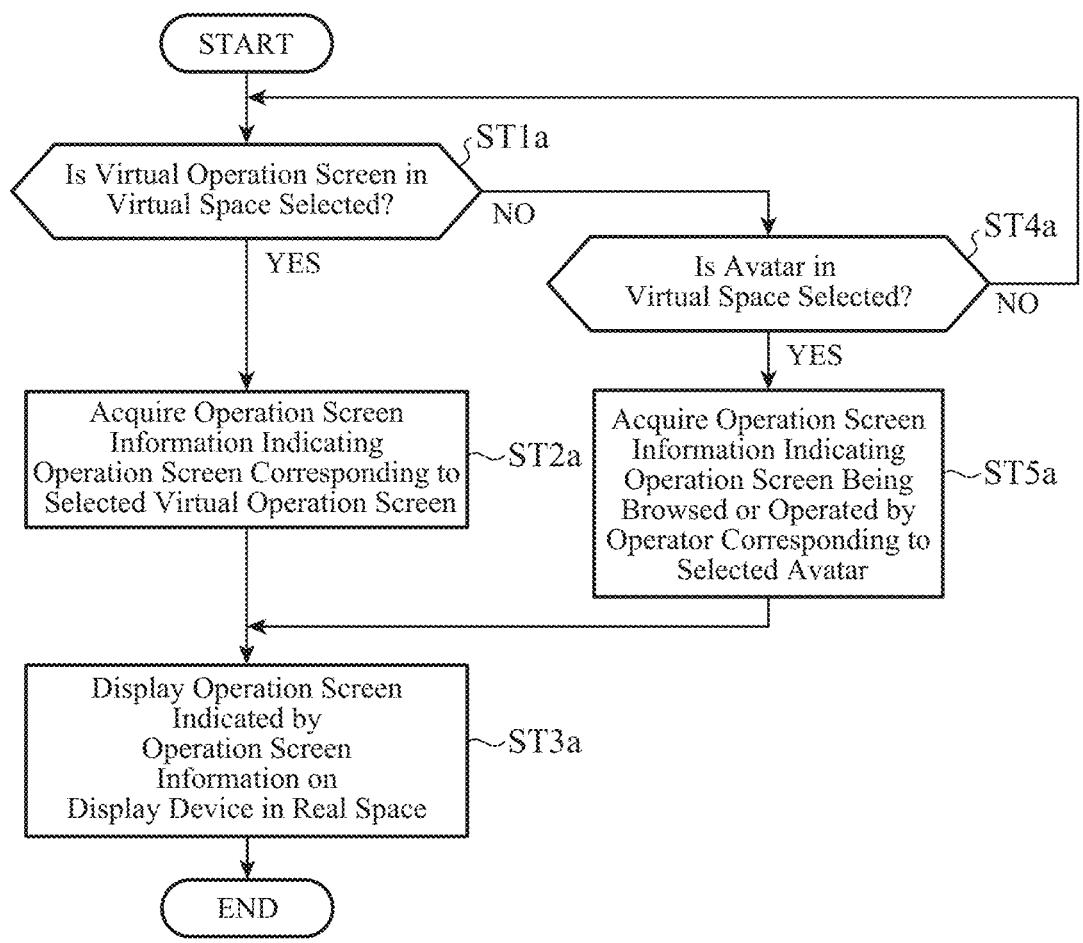
FIG. 13 is a flowchart illustrating a display method according to the third embodiment.
Figure 14:
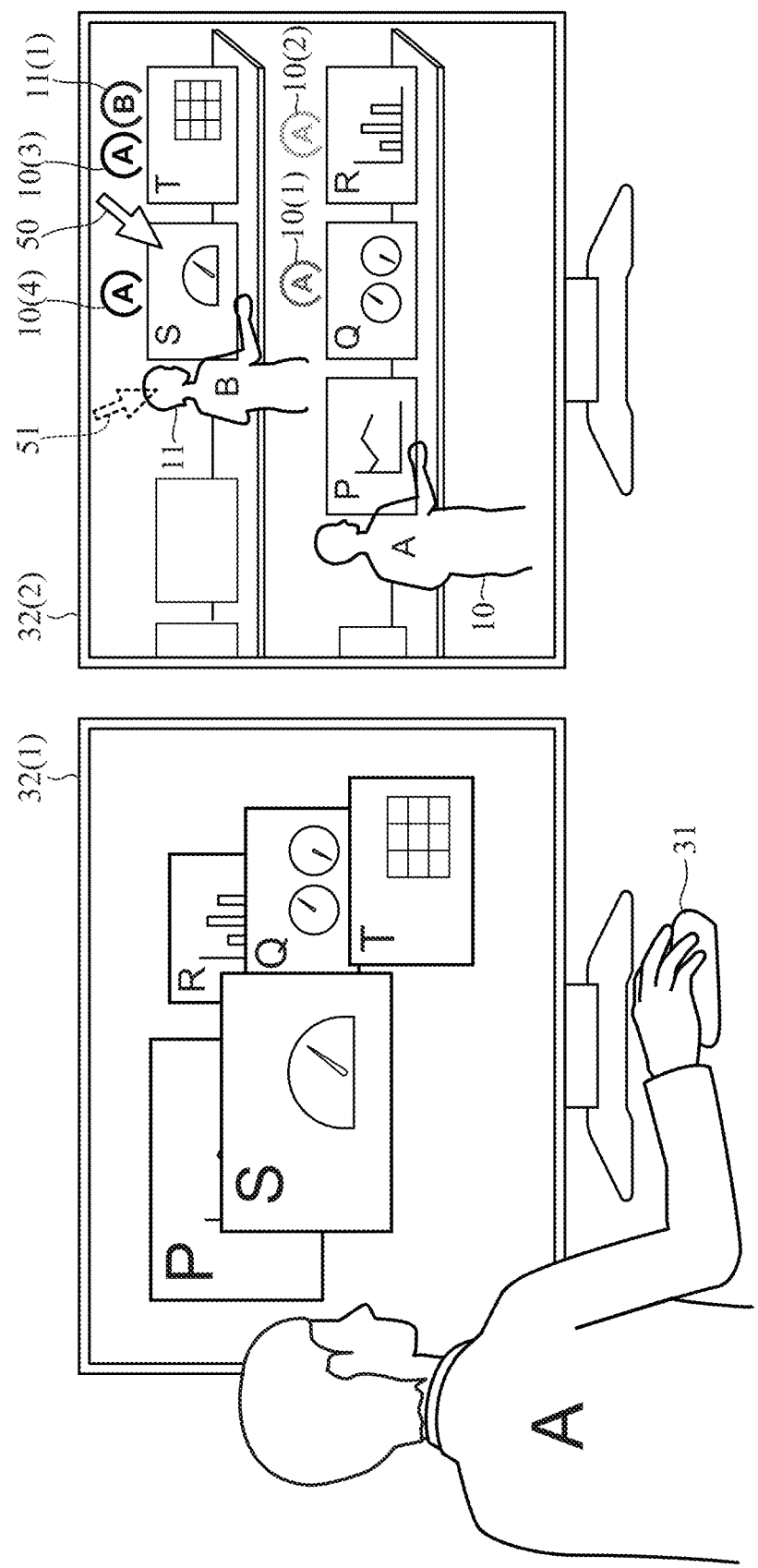
FIG. 14 is a view illustrating a display example of a display device in the third embodiment.

FIG. 13 is a flowchart illustrating a display method according to the third embodiment, and illustrates a series of processing performed after the processing in FIG. 4. Furthermore, FIG. 14 is a diagram illustrating display examples of the display device 32(1) and the display device 32(2). The operation screen providing unit 42A determines whether or not a virtual operation screen in the virtual space has been selected (step ST1a). For example, as illustrated in FIG. 14, when the operator A places a pointer 50 on the virtual operation screen S in the virtual space displayed on the display device 32(2) and clicks it using the input device 31, the virtual operation screen S is selected. The operation information indicating that the virtual operation screen S has been selected is output from the input device 31 to the control apparatus 2.

The control apparatus 2 outputs operation information indicating that the operator A has selected the virtual operation screen S to the virtual space providing apparatus 4B. The operation screen information acquiring unit 41 outputs the operation information acquired from the control apparatus 2 to the operation screen providing unit 42A and the virtual space providing unit 43B. The operation screen providing unit 42A determines that the operator A has selected the virtual operation screen S by acquiring the operation information.

When it is determined that the virtual operation screen in the virtual space has been selected (step ST1a; YES), the operation screen providing unit 42A acquires operation screen information indicating an operation screen corresponding to the selected virtual operation screen (step ST2a). For example, the operation screen information generating unit 22 included in the control apparatus 2 generates operation screen information corresponding to the virtual operation screen S selected by the operator A. The operation screen information acquiring unit 41 acquires the operation screen information from the operation screen information generating unit 22. The operation screen providing unit 42A acquires operation screen information corresponding to the virtual operation screen S selected by the operator A from the operation screen information acquiring unit 41.

The operation screen providing unit 42A displays, on the display device 32(1), the operation screen S corresponding to the virtual operation screen S selected by the operator A on the basis of the acquired operation screen information (step ST3a). For example, the operation screen providing unit 42A displays the operation screen S on the front surface of the display device 32(1) as illustrated in FIG. 14 on the basis of the operation screen information corresponding to the virtual operation screen S selected by the operator A. As a result, the operator A can browse or operate the operation screen S on the display device 32(1).

When it is determined that the virtual operation screen in the virtual space is not selected (step ST1a; NO), the operation screen providing unit 42A determines whether or not the avatar in the virtual space has been selected (step ST4a). For example, as illustrated in FIG. 14, when the operator A places the pointer 51 on the main avatar 11 in the virtual space displayed on the display device 32(2) and clicks it using the input device 31, the main avatar 11 is selected. The operation information indicating that the main avatar 11 has been selected is output from the input device 31 to the control apparatus 2.

The control apparatus 2 outputs operation information indicating that the operator A has selected the main avatar 11 to the virtual space providing apparatus 4B. The operation screen information acquiring unit 41 outputs the operation information acquired from the control apparatus 2 to the operation screen providing unit 42A and the virtual space providing unit 43B. By acquiring this operation information, the operation screen providing unit 42A determines that the operator A has selected the main avatar 11.

When it is determined that the avatar in the virtual space has been selected (step ST4a; YES), the operation screen providing unit 42A acquires operation screen information indicating the operation screen being browsed or operated by the operator corresponding to the selected avatar (step ST5a). For example, the operation screen information generating unit 22 included in the control apparatus 2 generates operation screen information corresponding to the operation screen T browsed by the operator B corresponding to the main avatar 11 selected by the operator A and the operation screen S operated by the operator B. The operation screen information acquiring unit 41 acquires the operation screen information from the operation screen information generating unit 22. The operation screen providing unit 42A acquires operation screen information indicating the operation screen T and the operation screen S from the operation screen information acquiring unit 41.

The operation screen providing unit 42A displays, on the display device 32(1), an operation screen being browsed or operated by the operator corresponding to the avatar selected by the operator on the basis of the acquired operation screen information (step ST3a). For example, the operation screen providing unit 42A displays the operation screen S and the operation screen T on the front surface of the display device 32(1) as illustrated in FIG. 14 on the basis of the operation screen information acquired from the operation screen information acquiring unit 41. As a result, the operator A can browse or operate the operation screen S and the operation screen T on the display device 32(1).

Thereafter, the virtual space providing unit 43B displays the sub avatar 10(4) corresponding to the operator A at a position in the virtual space corresponding to the virtual operation screen S, and displays the sub avatar 10(3) corresponding to the operator A at a position in the virtual space corresponding to the virtual operation screen T. The operation screen S and the operation screen T are displayed on the front surface of the display device 32(1), and it can be considered that the attention degree of the operator A is high. Therefore, the sub avatar 10(3) and the sub avatar 10(4) are displayed in at least one of a color, transparency, and a size according to the attention degree of the operator A.

Note that the functions of the operation screen information acquiring unit 41, the operation screen providing unit 42A, and the virtual space providing unit 43B in the virtual space providing apparatus 4B are implemented by the processing circuit illustrated in FIG. 6A or 6B. That is, the virtual space providing apparatus 4B includes a processing circuit for executing the processing from step ST1a to step ST5a illustrated in FIG. 13. The processing circuit may be dedicated hardware, or may be a CPU that executes a program stored in a memory.

As described above, in the virtual space providing apparatus 4B according to the third embodiment, when the virtual operation screen in the virtual space is selected, the operation screen information acquiring unit 41 acquires the operation screen information indicating the operation screen corresponding to the selected virtual operation screen from the control apparatus 2. The operation screen providing unit 42A displays, on the display device 32, an operation screen corresponding to the virtual operation screen selected by the operator on the basis of the operation screen information acquired by the operation screen information acquiring unit 41. As a result, the operator can browse or operate the operation screen corresponding to the virtual operation screen selected from the virtual space.

In the virtual space providing apparatus 4B according to the third embodiment, when an avatar in the virtual space is selected, the operation screen information acquiring unit 41 acquires, from the control apparatus 2, operation screen information indicating an operation screen being browsed or operated by an operator corresponding to the selected avatar. The operation screen providing unit 42A displays, on the display device 32, the operation screen being browsed or operated by the operator corresponding to the selected avatar on the basis of the operation screen information acquired by the operation screen information acquiring unit 41. As a result, the operator can browse or operate the operation screen being browsed or operated by the operator corresponding to the avatar selected from the virtual space.

Fourth Embodiment

Figure 15:
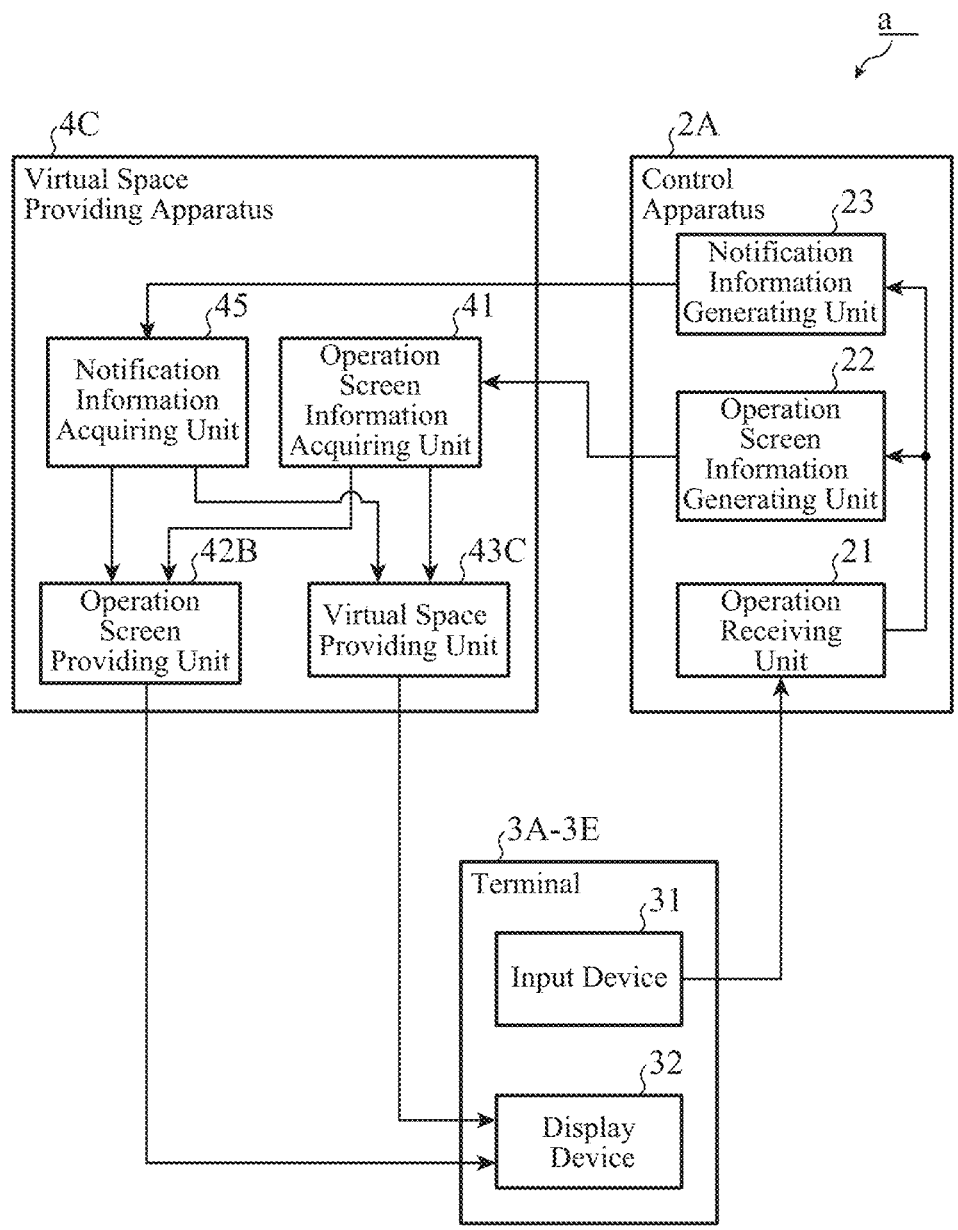
FIG. 15 is a block diagram illustrating a configuration of a display system according to a fourth embodiment.

FIG. 15 is a block diagram illustrating a configuration of a display system 1A according to a fourth embodiment. In FIG. 15, a control apparatus 2A is, for example, an apparatus that monitors and controls a facility to be monitored, and includes an operation receiving unit 21, an operation screen information generating unit 22, and a notification information generating unit 23. Each of the terminals 3A to 3E includes an input device 31 and a display device 32. A virtual space providing apparatus 4C includes an operation screen information acquiring unit 41, an operation screen providing unit 42B, a virtual space providing unit 43C, and a notification information acquiring unit 45.

The notification information generating unit 23 generates notification information for the operator. For example, the notification information generating unit 23 specifies a work in which an event that the operator should process immediately has occurred among various works performed in the virtual space, and generates an operation screen for performing the specified work and notification information indicating the above events. Examples of the event that the operator should process immediately include an abnormal operation of the facility to be monitored.

The notification information acquiring unit 45 acquires the notification information from the control apparatus 2A. For example, the notification information generated by the notification information generating unit 23 is information related to various works performed in the virtual space and is information related to processing using the operation screen indicated by the operation screen information. The notification information acquired by the notification information acquiring unit 45 is output to the operation screen providing unit 42B and the virtual space providing unit 43C.

The operation screen providing unit 42B displays the operation screen on the display device 32 together with the notification information on the basis of the operation screen information acquired by the operation screen information acquiring unit 41 and the notification information acquired by the notification information acquiring unit 45. On the basis of the operation screen information acquired by the operation screen information acquiring unit 41 and the notification information acquired by the notification information acquiring unit 45, the virtual space providing unit 43C displays, on the display device 32, a virtual operation screen in which the notification information is highlighted.

FIG. 16 is a diagram illustrating display examples of the display device 32(1) and the display device 32 2). In FIG. 16, it is assumed that an event to be immediately processed by the operator has occurred in work corresponding to the operation screen P, the operation screen Q, the operation screen R, and the operation screen S. The operation screen providing unit 42B specifies an operation screen to be used for performing work in which the event indicated by the notification information occurs among the operation screens indicated by the operation screen information, and displays, on the display device 32(1), the specified operation screen together with the notification information.

For example, the event indicated by the notification information occurs in the work using the operation screen P, the operation screen Q, and the operation screen R among the operation screen P, the operation screen Q, the operation screen R, and the operation screen T browsed or operated by the operator A. Therefore, the operation screen providing unit 42B generates warning images 45(1), 45(2), and 45(3) for notifying that an event to be immediately processed by the operator has occurred, and displays, on the display device 32(1), the operation screen P including the warning image 45(1), the operation screen Q including the warning image 45(2), and the operation screen R including the warning image 45(3).

The virtual space providing unit 43C generates warning images 46(1), 46(2), 46(3), and 46(4) for notifying that an event to be immediately processed by the operator has occurred, and displays, on the display device 32(2), a virtual operation screen P in which the warning image 46(1) is highlighted, a virtual operation screen Q in which the warning image 46(2) is highlighted, a virtual operation screen R in which the warning image 46(3) is highlighted, and a virtual operation screen S in which the warning image 46(4) is highlighted. The highlight display of the warning image means that the warning image is displayed in a more emphasized manner than the operation screen displayed on the display device 32(1) so as to be browsed or operable by the operator.

For example, in FIG. 16, warning images 45(1), 45(2), and 45(3) are arranged in the operation screen with a size that does not hinder the browsing of the contents of the operation screen. On the other hand, the warning images 46(1), 46(2), 46(3), and 46(4) are displayed in such a size as to protrude from the virtual operation screen. By visually recognizing the warning image highlighted in the virtual space, the operator can easily grasp that the event to be immediately processed has occurred in the work corresponding to the virtual operation screen.

Note that the warning image is displayed in such a size as to protrude from the virtual operation screen, but the highlight display is not limited thereto. For example, the virtual space providing unit 43C may display the warning images in red to call the operator's attention, or may display the warning images in a shape different from the warning images arranged in the operation screen.

Furthermore, the virtual space providing unit 43C may calculate the number of notifications in the virtual space on the basis of the notification information and display the virtual space including an image indicating the calculated number of notifications on the display device 32(2).

For example, the virtual space providing unit 43C calculates, as the number of notifications, the number of operation screens used for performing the work in which the event indicated by the notification information has occurred among the operation screen P, the operation screen Q, the operation screen R, the operation screen S, and the operation screen T indicated by the operation screen information. In the example illustrated in FIG. 16, there are four screens of the operation screen P, the operation screen Q, the operation screen R, and the operation screen S. The virtual space providing unit 43C generates a warning image 46 indicating the number of notifications, and displays the generated warning image 46 on the display device 32(2). By visually recognizing the warning image 46, the operator can easily grasp how many events to be processed immediately have occurred in the virtual space.

Note that the load calculating unit 44 described in the second embodiment may be added to the virtual space providing apparatus 4C. By including the load calculating unit 44, the virtual space providing unit 43C displays, on the display device 32(2), the virtual space including the image 44C indicating the number of operators calculated by the load calculating unit 44. By visually recognizing the image 44C, the operator can easily recognize the number of operators who are performing work other than the operator.

Note that the functions of the operation screen information acquiring unit 41, the operation screen providing unit 42B, the virtual space providing unit 43C, and the notification information acquiring unit 45 in the virtual space providing apparatus 4C are implemented by the processing circuit illustrated in FIG. 6A or 6B. That is, the virtual space providing apparatus 4C includes a processing circuit for executing each processing described in the fourth embodiment. The processing circuit may be dedicated hardware, or may be a CPU that executes a program stored in a memory.

As described above, the display system 1A according to the fourth embodiment includes the notification information acquiring unit 45 that acquires notification information related to processing using the operation screen indicated by the operation screen information. The operation screen providing unit 42B displays, on the display device 32(1), the operation screen together with the warning image indicating the notification information on the basis of the operation screen information and the notification information. The virtual space providing unit 43C displays, on the display device 32(2), a virtual operation screen in which a warning image indicating the notification information is highlighted on the basis of the operation screen information and the notification information. By visually recognizing the highlighted warning image, the operator can easily grasp that the event to be immediately processed has occurred in the work corresponding to the virtual operation screen.

In the display system 1A according to the fourth embodiment, the virtual space providing unit 43C calculates the number of notifications in the virtual space on the basis of the notification information, and displays, on the display device 32(2), the virtual space including the warning image 46 indicating the number of notifications. By visually recognizing the warning image 46, the operator can easily grasp how many events to be processed immediately have occurred in the virtual space.

Note that combinations of the respective embodiments, modifications of arbitrary components of the respective embodiments, or omissions of arbitrary components in the respective embodiments are possible.

INDUSTRIAL APPLICABILITY

The display system according to the present disclosure can be used in, for example, a plant monitoring control system that operates by a remote operation of an operator.

REFERENCE SIGNS LIST

1, 1A: display system, 2, 2A: control apparatus, 3A to 3E: terminal, 4, 4A to 4C: virtual space providing apparatus, 10 to 14: main avatar, 10(1) to 10(4), 11(1): sub avatar, 21: operation receiving unit, 22: operation screen information generating unit, 23: notification information generating unit, 31: input device, 32, 32(1), 32(2): display device, 41: operation screen information acquiring unit, 42, 42A, 42B: operation screen providing unit, 43, 43A to 43C: virtual space providing unit, 44: load calculating unit, 44A: text image, 44B: work time image, 44B1 to 44B3: image portion, 44C: image, 45(1) to 45(3), 46(1) to 46(4): warning image, 50, 51: pointer, 100: input interface, 101: output interface, 102: processing circuit, 103: processor, 104: memory

The invention claimed is:

1. A display system comprising processing circuitry
to acquire operation screen information indicating an operation screen for receiving an operation by an operator,
to provide the operation screen indicated by the operation screen information to the operator by displaying the operation screen on a display device, and
to provide a virtual space including a virtual operation screen simulating the operation screen indicated by the operation screen information to the operator by displaying the virtual space on a display device,
wherein when the processing circuitry acquires the operation screen information indicating the operation screen being browsed or operated by the operator, the processing circuitry displays an avatar corresponding to the operator at a position in the virtual space corresponding to the virtual operation screen simulating the operation screen.

2. The display system according to claim 1, wherein processing circuitry displays the avatar being a main avatar corresponding to the operator at a position in the virtual space corresponding to the virtual operation screen simulating the operation screen operated by the operator, and displays the avatar being a sub avatar corresponding to the operator at a position in the virtual space corresponding to the virtual operation screen simulating the operation screen only browsed by the operator.

3. The display system according to claim 2, wherein the processing circuitry displays the sub avatar in at least one of a color, transparency, and a size corresponding to an attention degree of the operator to the operation screen displayed on a display device.

4. The display system according to claim 2, wherein the processing circuitry displays the sub avatar in at least one of a color, transparency, and a size corresponding to a display area of the operation screen in a screen of a display device.

5. The display system according to claim 1, wherein the processing circuitry displays at least a portion of the avatar overlapping the virtual operation screen as viewed from a display screen of a display device with only a contour of the avatar.

6. The display system according to claim 1, wherein the processing circuitry further performs to calculate a value indicating a workload of the operator, and
to display the avatar in a color corresponding to the workload.

7. The display system according to claim 6, wherein the processing circuitry displays the avatar to which image information indicating the workload is added.

8. The display system according to claim 6, wherein the processing circuitry calculates, as the workload, at least one of a number of unprocessed tasks of the work corresponding to the operation screen or a continuous work time of the operator using the operation screen.

9. The display system according to claim 6, wherein
the processing circuitry calculates a number of operators, and
the processing circuitry displays, on a display device, the virtual space including an image indicating the number of the operators.

10. The display system according to claim 1, wherein
the processing circuitry, when the virtual operation screen in the virtual space is selected, acquires the operation screen information indicating the operation screen corresponding to the virtual operation screen selected, and
the processing circuitry displays, on the display device, the operation screen corresponding to the virtual operation screen selected by the operator on a basis of the operation screen information.

11. The display system according to claim 1, wherein
the processing circuitry, when the avatar in the virtual space is selected, acquires the operation screen information indicating the operation screen being browsed or operated by the operator corresponding to the avatar selected, and
the processing circuitry displays, on a display device, the operation screen being browsed or operated by the operator corresponding to the avatar selected on a basis of the operation screen information.

12. The display system according to claim 1, wherein the processing circuitry further performs to acquire notification information related to processing using the operation screen indicated by the operation screen information,
to display, on a display device, the operation screen together with an image indicating the notification information on a basis of the operation screen information and the notification information, and to display, on a display device, the virtual operation screen in which the image indicating the notification information is highlighted on a basis of the operation screen information and the notification information.

13. The display system according to claim 12, wherein the processing circuitry calculates a number of notifications in the virtual space on a basis of the notification information, and displays, on a display device, the virtual space including an image indicating the number of notifications calculated.

14. The display system according to claim 1, wherein the processing circuitry adds an image indicating a second operator to the operation screen being browsed or operated by the second operator that is an operator other than a first operator among a plurality of operation screens, each of which is the operation screen being browsed or operated by the first operator, and displays the operation screen on the display device.

15. A virtual space providing apparatus, comprising processing circuitry
to acquire operation screen information indicating an operation screen for receiving an operation by an operator,
to provide the operation screen indicated by the operation screen information to the operator by displaying the operation screen on a display device, and
to provide a virtual space including a virtual operation screen simulating the operation screen indicated by the operation screen information to the operator by displaying the virtual space on a display device,
wherein when the processing circuitry acquires the operation screen information indicating the operation screen being browsed or operated by the operator, the processing circuitry displays a main avatar corresponding to the operator at a position in the virtual space corresponding to the virtual operation screen simulating the operation screen operated by the operator, and displays a sub avatar corresponding to the operator at a position in the virtual space corresponding to the virtual operation screen simulating the operation screen only browsed by the operator.

16. A display method implemented by a processing circuitry for:
acquiring operation screen information indicating an operation screen for receiving an operation by an operator;
providing the operation screen indicated by the operation screen information to the operator by displaying the operation screen on a display device; and
providing a virtual space including a virtual operation screen simulating the operation screen indicated by the operation screen information to the operator by displaying the virtual space on a display device,
wherein when the processing circuitry acquires the operation screen information indicating the operation screen being browsed or operated by the operator, the processing circuitry displays an avatar corresponding to the operator at a position in the virtual space corresponding to the virtual operation screen simulating the operation screen.

* * * * *